Dec. 13, 1955  M. E. HAINE  2,727,204
VOLTAGE STABILIZING SYSTEMS
Filed Oct. 24, 1950  2 Sheets-Sheet 1

Inventor:
Michael E. Haine,
by Paul A. Frank
His Attorney.

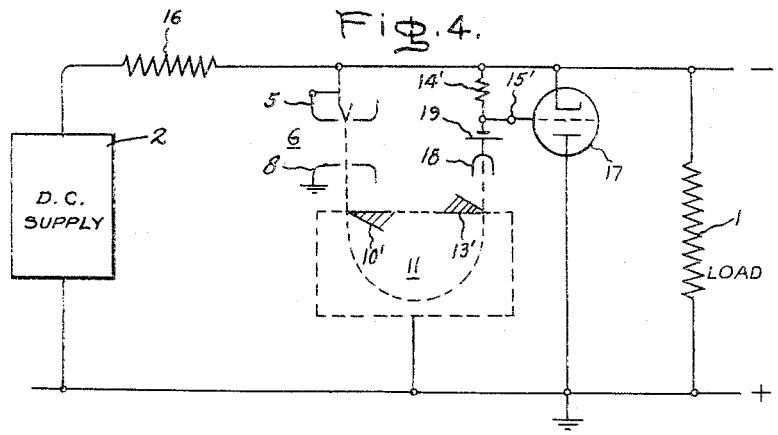
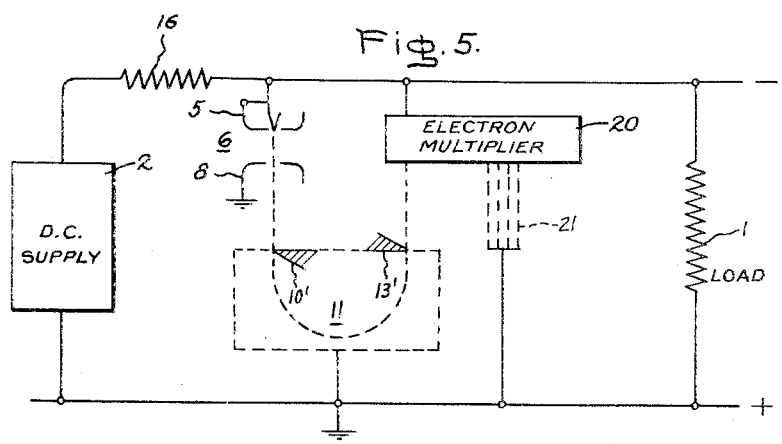
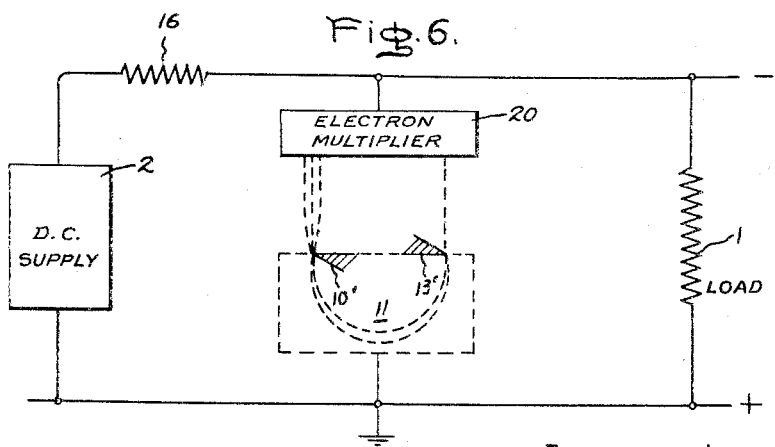

United States Patent Office 2,727,204
Patented Dec. 13, 1955

2,727,204

VOLTAGE STABILIZING SYSTEMS

Michael Edward Haine, Sulhamstead, England, assignor to General Electric Company, a corporation of New York Application October 24, 1950, Serial No. 191,853

Claims priority, application Great Britain October 27, 1949

7 Claims. (Cl. 323—22)

This invention relates to systems for stabilizing voltage, and in particular to novel systems utilizing mass spectrometric principles for control purposes.

The stabilizing of high voltages, that is voltages of the order of 30 kv. and upwards, to a high order of accuracy has become very important in recent years on account of the requirements of electron microscopes, electron diffraction and other specialized apparatus.

Such requirements involve the obtaining of a very constant voltage, and although in some cases it may only be required to know the absolute value to a few percent, in other cases it may be required to know the absolute value to a high degree of accuracy, the former case being the most general.

A commonly used method of voltage stabilizing involves the measurement of the high voltage changes and the generation and application of an appropriate correction.

In one known arrangement which employs a negative feedback system, the high voltage is measured by some device such as a resistance potential divider which produces a signal voltage near earth potential proportional to the high voltage. The changes in this signal voltage are amplified by a D. C. amplifier, the output of which is applied in some manner to modulate the output of the high voltage generator so as to cancel out the voltage variations. Complete cancellation is, of course, not possible since, if this occurred, there could be no signal voltage and hence no correction. What actually happens is that voltage changes are reduced in magnitude by an amount which is almost exactly equal to the total gain or amplification round the feedback loop. This gain is the product of the attenuation of the measuring device (which for example may be $\frac{1}{1000}$), the amplifier gain (for example 100,000), and the modulation gain or change in high voltage produced for unit amplifier output (for example 10). Thus, for the examples quoted, the high voltage changes would be reduced by $\frac{1}{1000} \times 100,000 \times 10 = 1,000$ times. This figure is called the stabilization ratio.

This method of stabilization is quite satisfactory, provided the feedback components are themselves sufficiently stable. In particular, the measuring device (potential divider) and the amplifier input stage must be as stable as the required high voltage stability.

For stabilities of much better than one part in 10,000 this requirement is extremely difficult to meet. A resistance potential divider, if wound from wire, may be made with stabilities approaching one part in 100,000, but only if fairly thick wire is used. This means either a very large and expensive divider unit or a very heavy current drain; neither of which is desirable. In addition, great care must be taken to avoid leakage currents flowing in parallel with the divider or parts of it. For example, leakage currents of the order of one hundred thousandth of the current taken by the divider are significant if a stability of one part in a hundred thousand is required.

A further disadvantage of a resistance divider lies in the fact that its use necessarily involves a large attenuation and this attenuation must be made up by the amplifier before any useful gain can be obtained. In addition, the minimum signal level at the input stage of the amplifier is now one part in a hundred thousand divided by the divider attenuation of the total voltage, for example for 100 kv. and a divider attenuation of 1,000, the minimum signal level is one millivolt. It is not easy to obtain a long term stability of this order in a valve.

An object of the present invention is to provide an improved voltage stabilizing system, particularly for use with very high voltage supplies, including a device which, as compared with a resistance potential divider, has no appreciable attenuation; it may in fact have a gain, and provide much greater intrinsic stability.

According to the present invention, in the improved voltage stabilizing system the supply to be stabilized is applied to accelerate a beam of electrons which is then deflected by a constant magnetic or electrostatic field to follow an arcuate path at the exit of which an electrode is arranged which interrupts the beam to an extent dependent upon the radius of the path, and hence upon the magnitude of the accelerating potential, and the current received by this electrode, or as regards that part of the beam which is not intercepted, the current received by a further beam collecting electrode, is applied to modulate the supply in such manner as to oppose change in voltage of the supply. Preferably an electron lens arrangement is provided to focus the beam in a plane at the entrance to the arcuate path. This portion of the device may be likened to a magnetic spectrometer and will be so termed hereafter.

In such an arrangement the electrons travel in the magnetic field along the arc of a circle whose diameter is given by the relation:

$$D = \frac{6.74\sqrt{V}}{B} \text{ cms.}$$

V being the accelerating voltage and B the magnetic flux density in the spectrometer field.

Preferably the spectrometer field is so arranged that the electron beam traverses approximately a semicircle and then partially falls on the beam-intercepting electrode which is preferably knife-edged. This knife-edged electrode is insulated from the rest of the spectrometer and a lead is brought out of the vacuum so that the electron current falling on the electrode can be measured.

If now the voltage of the supply, that is the accelerating voltage (V) changes by an amount $\delta V$, the beam will shift on (or off) the electrode by distance $\delta D$ given by $$\frac{\delta D}{D} = \frac{\delta V}{V}$$

where D is the full electron orbit diameter in the spectrometer field. If the current per unit width of the beam is $\rho$ then the measured current $$\delta I = \rho \delta D = \rho D \frac{\delta V}{V}$$

This current change can be related to the high voltage change in terms of a mutual conductance (g) exactly analogous to the mutual conductance of a triode amplifier valve as follows:

Mutual conductance, $g = \frac{\text{Output current change}}{\text{H. V. voltage change}} = \frac{\delta I}{\delta V}$ $$= \frac{\rho D}{V}$$

If a resistance (R) is connected in series with the beam-intercepting electrode, a voltage ($R\delta I$) will be developed across it. This voltage ($\delta V_0$) is given by:

$$\delta V_0 = R\delta I = R\rho D \frac{\delta V}{V}$$

The ratio of $$\frac{\delta V_0}{\delta V}$$

can now be termed the gain (G) of the system:

$$G = \frac{\delta V_0}{\delta V} = R\frac{\rho D}{V} = gR$$

Similar considerations would apply if the current which misses the electrode were collected and passed through a resistance.

Calculation shows that by using a reasonably efficient electron gun and using a weak focusing lens before the spectrometer, a mutual conductance of as much as 1 microampere/volt may be obtained. Thus, with a series resistance of 10 megohms, a gain of 10 may be predicted. This should be compared with the attenuation of 1,000 times obtained with the usual type of divider measuring device.

The output voltage across the series resistor can straightway be fed into a feedback amplifier, which will now only require to have a low gain since it does not have to make up for the attenuation of the conventional form of divider. Furthermore, the minimum signal lever is now a few volts rather than a few millivolts, and hence no serious amplifier input stability problem arises.

It is contemplated that the electron source will preferably be constituted by an electron gun including a cathode and an accelerating electrode between which is applied the accelerating voltage. The measuring or detecting device thus far described suffers from the limitation that, if the electron gun current varies by a small amount, the output current on the beam intercepting electrode will vary in proportion, and in a voltage stabilizer the high voltage would accordingly be changed by the same amount to cause a corresponding change in the output current. To avoid this difficulty the electron beam current may be stabilized, but the necessity for this may be eliminated by an improved arrangement in which the beam is arranged only just to touch the beam-intercepting electrode, so that the total current falling on the electrode is only a few times the change in current required to give the necessary change in the high voltage.

Since in general, however, the current density across a focused beam rises to a maximum at the center, it is only when the beam is approximately bisected by the intercepting electrode that a maximum mutual conductance would be obtained. This difficulty may be overcome by arranging another electrode, also preferably knife-edged, at the entrance to the spectrometer so that the beam is approximately bisected. The electron beam is focused onto this beam-bisecting electrode and the spectrometer then arranged to focus a relatively sharp image of the half spot on to the beam-intercepting electrode with the sharp or "cut" edge of the spot just overlapping the knife edge and most of the beam missing it. This now has the advantage that the total current on the intercepting electrode is a small proportion of the total beam current, hence the device is relatively independent of the electron gun current, while at the same time the mutual conductance is a maximum.

The focused image of the half spot will not be exactly sharp as it suffers from aberrations associated with the focusing of the spectrometer. It can, however, be shown that these are relatively unimportant, and could in any case be eliminated or greatly reduced, if required, by the use of well-known modifications to the spectrometer system.

In order that the invention may be clearly understood reference will now be made to the accompanying drawings, in which:

Figs. 3 and 4 show parallel valve voltage stabilizing arrangements according to the invention, and Figs. 5 and 6 show modified voltage stabilizing arrangements employing electron multipliers in place of thermionic valves.

Figure 1:
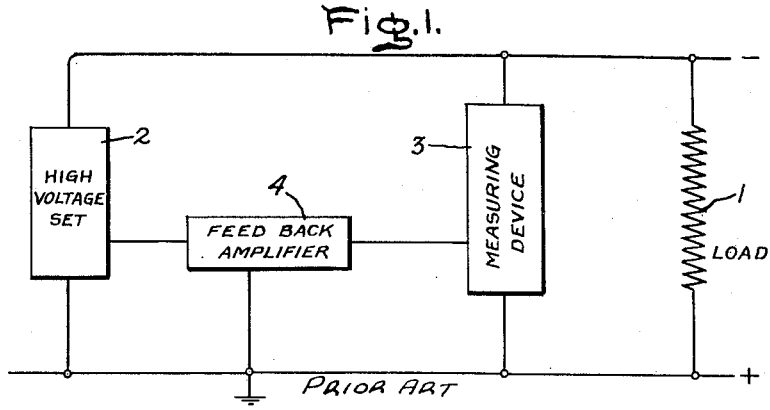
Fig. 1 is a block diagram illustrating a known negative feedback system of voltage stabilization useful in explaining the invention.

Referring to Fig. 1, a load 1 is supplied from a D. C. supply source 2 providing a high voltage which is measured in a device 3 comprising, for example, a resistance potential divider (not shown). Fluctuations in the high voltage are reproduced at a lower mean potential at the output of the device 3 and are fed back through a D. C. amplifier 4 to the source 2 in such a manner as to tend to cancel out the voltage fluctuations. As has been pointed out earlier, complete cancellation is not, of course, possible since, if this occurred, there would be no output from the device 3 and hence no correction of the source 2. The voltage fluctuations are, however, reduced in magnitude by an amount almost equal to the total gain or amplification round the feedback loop.

Figure 2:
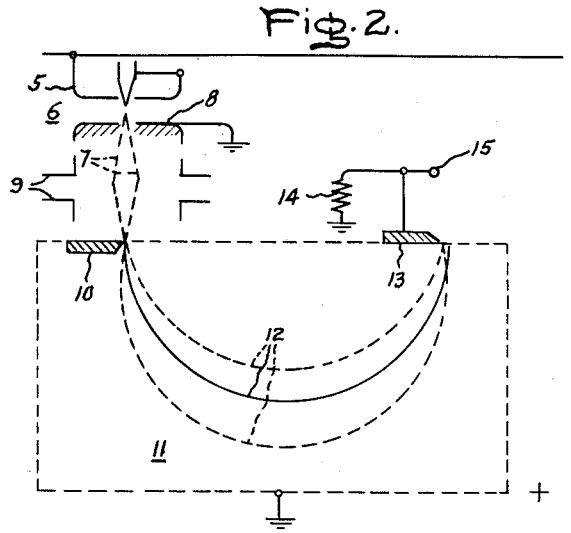
Fig. 2 shows a measuring or detecting device according to the invention.

Fig. 2 shows a device according to the invention which measures or detects fluctuations in a high voltage and can thus be used as the measuring device 3 in the system of Fig. 1 with the advantages already mentioned.

In Fig. 2 the cathode 5 of an electron gun 6 is connected to the negative terminal of a high voltage D. C. source. A beam of electrons, indicated by the dotted lines 7, is produced by the electron gun 6 under the influence of the accelerating voltage existing between the cathode 5 and the earthed accelerating electrode 8, and is focused by an electron lens arrangement 9 on to the edge of a knife-edged electrode 10 which bisects the beam. The half of the beam not intercepted by the electrode 10 passes into a spectrometer-like arrangement 11 where it is subjected to force producing means for deflecting the electron beam in an arcuate path having a curvature transverse to the direction of the acceleration of the beam. In the present case, the force producing means may comprise a constant magnetic field acting at right angles to the plane of the paper or a properly shaped electrostatic field which causes the electron beam to follow an arcuate path as indicated by the curved lines 12. At the end of the arcuate path is located a second knife-edged electrode 13; this electrode is insulated except for a connection through a resistance 14 to earth and is so disposed that the sharp or "cut" edge of the bisected beam just overlaps the knife edge, most of the beam missing it. In this way the total current falling on the electrode 13 is a small proportion of the total beam current and so is relatively independent of the electron gun current, while at the same time mutual conductance is kept as high as possible.

If fluctuations occur in the high D. C. voltage, these are effective to vary the accelerating voltage between the cathode 5 and anode 8 of the electron gun 6; this, in turn, causes variations in the radius of the arcuate path followed by the beam in the spectrometer 11, so that a greater or smaller electron current will fall on the electrode 13. Such current variations produce voltage variations across the resistance 14, and these voltage variations, appearing at the output terminal 15, give a measure of the voltage fluctuations in the high D. C. voltage.

In the design of negative feedback stabilizing systems, it is well known that the system will be intrinsically unstable if the total phase delay reaches 180° at a frequency where the gain is still greater than unity. Although multi-stage systems may be designed which avoid this difficulty, the frequency response of the amplifier may have to be seriously restricted, especially if a high gain is required.

It is therefore preferred, if possible, to use only two stages since in this case a delay of greater than 180° cannot be obtained if the circuit elements are only simple resistance capacity units. This would appear to be just possible when using the device of the present invention since, if it gives a gain of 10 and if the modulating device could be made to give a gain of 100, an overall gain of 1,000 would result which already gives a very useful stabilizing ratio. It could, for example improve the stability of a supply from 1% to 1 part in 100,000, an initial stability of 1% being obtainable with reasonable ease.

Figure 3:
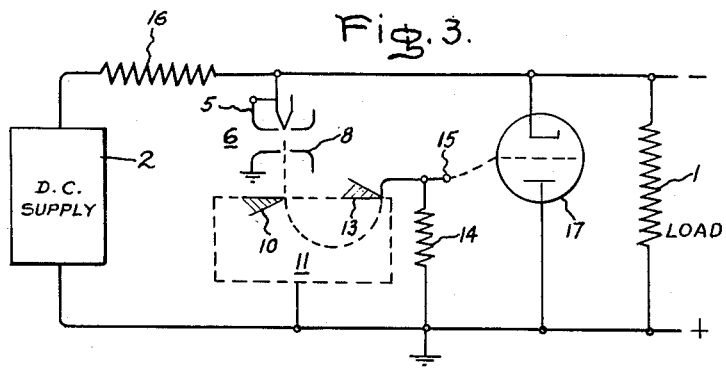

In Fig. 3, which shows how the device of Fig. 2 could be used in such a two-stage arrangement, the high voltage supply from the source 2 is fed to the load 1 through a resistance 16 which is preferably as large as possible, the maximum value being limited by the permissible drop which usually must be kept small compared with the total voltage. As shown, the positive terminal of the supply 2 is at earth potential. Accordingly the cathode 5 of the electron gun 6 is connected with the negative terminal of the supply, while the accelerating electrode 8 is connected directly with earth and the intercepting electrode 13 is connected with earth through the resistance 14. A triode valve 17 connected in parallel with the load 1 is modulated so as to vary the total current in such a way as to keep the voltage across the load 1 constant by providing a suitable coupling, not shown but indicated by the dotted line, between the output terminal 15 of the device of Fig. 2 and the grid of the valve 17. In a practical case, the resistance 14 might be 10 megohms and the mutual conductance of the parallel valve 10 microamperes per volt, giving a gain of 100, or 1,000 total.

In such a simple arrangement, however, the output terminal 15 is at or near the potential of the positive terminal of the supply, while the grid of the valve 17 must be near the potential of the negative terminal: the output terminal 15 and the grid cannot therefore be connected by a direct coupling. Connection could indeed be made indirectly but it would be difficult or impossible to do so without introducing an additional phase delaying circuit which might make the circuit unstable. Alternatively, the valve 17 could be arranged in series with the positive terminal of the supply, but if the parallel arrangement is preferred, the arrangement shown in Fig. 4 may be used in order to overcome the above-mentioned difficulty.

In the arrangement of Fig. 4, the device of Fig. 2 has been modified by turning the beam-bisecting electrode 10' through 180° with respect to the corresponding electrode 10 in Fig. 2 and arranging that the bisected beam now falls mainly on the electrode 13' (which is not insulated as is the electrode 13 in Fig. 2) with the sharp or "cut" edge of the beam "spilling over" the electrode 13 and passing across a gap towards a collecting electrode 18 connected to the negative high voltage terminal, which electrode the beam will reach at a velocity approaching zero. The electrode 18 is biased slightly positively with respect to the negative H. V. terminal by a low D. C. voltage source 19 to ensure that the beam is collected before it reaches zero velocity. The current thus collected is passed through a resistance 14', as previously described, and a voltage is obtained at the output terminal 15' which can now be connected directly to the grid of the parallel valve 17.

In some circumstances it is advantageous to obtain a gain higher than that given by the above described arrangements, and according to a modification of the invention, this is achieved by using an electron multiplier to multiply the beam returning to the H. V. terminal. Such a modified arrangement is shown in Fig. 5 in which the portion of the beam "spilling over" the electrode 13' is applied to the input electrode of an electron multiplier 20. In the arrangement of Fig. 5 the need for the parallel valve is eliminated by connecting the output electrode 21 of the multiplier to the earthed positive side of the D. C. supply since the beam electrons entering the multiplier fall to earth potential after multiplication, thus effectively loading the circuit. For example, if the H. V. potential rises 1 volt and the beam current increases by, say 1 microamp, this current will be multiplied say 1,000 times, giving a loading current of 1,000 microamps and a feedback gain of $$\frac{10 \text{ megohms} \times 1,000 \text{ microamps}}{1 \text{ volt}} = 10,000$$

It has been stated earlier that it is contemplated that the electron source will normally be an electron gun. Where, however, a secondary emission electron multiplier is employed as in Fig. 5, according to a modification of the invention, the electron input to the spectrometer 11 is provided not by an electron gun but from the output of the secondary emission multiplier. This arrangement is illustrated in Fig. 6. In this case, if a small current, say of the order of $10^{-8}$ amperes, is imagined to leave the multiplier 20 continuously due to random emission therein, for so long as the D. C. voltage remains below the critical value where the electrons entering the spectrometer 11 can "spill over" the electrode 13', no electrons will enter th multiplier 20. As soon as the voltage rises to such an extent that some of the current does "spill over," the "spilled" current will return to the multiplier 20 and will there be greatly increased, increasing the output current and consequently the input to the spectrometer 11. Thus, an unstable situation arises suddenly where the load current on the supply is very greatly increased. This will, of course, immediately hold down the voltage to a value minutely in excess of the value where "spill over" commences.

What I claim is:

1. A stabilizing system for a high voltage supply comprising detecting means comprising a source of electrons and accelerating means connected to the output terminals of the high voltage supply for accelecating the electrons in a beam to a velocity dependent upon the output voltage of the high voltage supply, force producing means coupled to said accelerated electron beam for deflecting said electron beam in an arcuate path having a curvature transverse to the direction of the acceleration of said electron beam whereby the position of exit of said electron beam from said force producing means various as a function of the velocity of said electron beam and hence as a function of the output voltage of the high voltage supply, and collector electrode structure located adjacent the exit position of said electron beam from said force producing means for intercepting a portion of said electron beam; and circuit means connected to said collector electrode structure for utilizing said intercepted portion of said electron beam to stabilize the output voltage of said high voltage supply.

2. A stabilizing system for a high voltage supply comprising detecting means comprising a source of electrons and means connected to the output terminals of the high voltage supply for accelerating the electrons in a beam to a velocity dependent upon the output voltage of the high voltage supply, a first electrode position within the path of said accelerated beam for substantially bisecting said beam, force producing means coupled to said accelerated and substantially bisected electron beam for deflecting said electron beam in an arcuate path having a curvature transverse to the direction of the acceleration of said electron beam whereby the position of exit of said electron beam from said force producing means varies as a function of the velocity of said electron beam and hence as a function of the output voltage of the high voltage supply, and a second electrode located adjacent the exit position of said electron beam from said force producing means to intercept a portion of said bisected electron beam; and circuit means connected to said second electrode for utilizing said intercepted portion of said electron beam to stabilize the output voltage of said high voltage supply.

3. A stabilizing system for a high voltage supply comprising detecting means comprising a source of electrons and energizing means having terminals connected in circuit with the output terminals of the high voltage supply for accelerating the electrons in a beam to a velocity dependent upon the output voltage of the high voltage supply, force producing means coupled to said accelerated electron beam for deflecting said electron beam in an arcuate path having a curvature transverse to the direction of the acceleration of said electron beam whereby the position of exit of said electron beam from said force producing means varies as a function of the velocity of said electron beam and hence as a function of the output voltage of the high voltage supply, collector electrode structure located adjacent the exit position of said electron beam; and circuit means connected to said collector electrode structure for developing a voltage proportional to the current represented by said intercepted portion of said electron beam including an impedance connected to said collector electrode structure, and an electron discharge device having a discharge path connected across the terminals of said energizing means and a control electrode connected in circuit with said collector electrode structure.

4. A stabilizing system for a high voltage supply comprising detecting means comprising a source of electrons and energizing means having terminals connected in circuit with the output terminals of the high voltage supply for accelerating the electrons in a beam to a velocity dependent upon the output voltage of the high voltage supply, a first electrode positioned within the path of said accelerated beam for substantially bisecting said beam, force producing means coupled to said accelerated and substantially bisected electron beam for deflecting said electron beam in an arcuate path having a curvature transverse to the direction of acceleration of said electron beam whereby the position of exit of said electron beam from said force producing means varies as a function of the velocity of said electron beam and hence as a function of the output voltage of the high voltage supply, a second electrode located adjacent the exit position of said accelerated bisected electron beam from said force producing means and being arranged to permit the "cut" edge of said bisected beam to just "spill over" said second electrode when the output voltage of the high voltage supply has a predetermined value, collector electrode means located in the path of the portion of said electron beam which "spills over" said second electrode; and an electron discharge device responsive to the amount of said electron beam collected by said collector electrode structure and connected in circuit with the terminals of said energizing means for stabilizing the high voltage supply at the predetermined value.

5. A system as in claim 4 in which said first and second electrodes have knife edges and are located on the same side of said electron beam.

6. A system as in claim 5 in which said electron discharge device includes an electron multiplier discharge device and said collector electrode means includes the cathode of said electron multiplier discharge device.

7. A system as in claim 5 in which said electron discharge device includes an electron multiplier discharge device, said collector electrode means includes the cathode of said electron multiplier discharge device, and said source of electrons and said energizing means include the output electrode of said electron multiplier discharge device.

References Cited in the file of this patent
UNITED STATES PATENTS

| | | |
|---|---|---|
| 2,138,928 | Klemperer | Dec. 6, 1938 |
| 2,272,165 | Varian et al. | Feb. 3, 1942 |
| 2,450,602 | Levialdi | Oct. 5, 1948 |
| 2,475,613 | Hastings | July 12, 1949 |
| 2,603,687 | Giacolette | July 15, 1952 |